(12) United States Patent
Thfoin (10) Patent No.: US 8,566,156 B2
(45) Date of Patent: Oct. 22, 2013

(54) COMBINING SEGMENTS OF USERS INTO VERTICALLY INDEXED SUPER-SEGMENTS

(75) Inventor: Guillaume Thfoin, Rolle (CH)

(73) Assignee: Yahoo! Inc., Sunnyvale, CA (US)

( * ) Notice: Subject to any disclaimer, the term of this patent is extended or adjusted under 35 U.S.C. 154(b) by 289 days.

(21) Appl. No.: 13/176,057

(22) Filed: Jul. 5, 2011

(65) Prior Publication Data

US 2013/0013394 A1 Jan. 10, 2013

(51) Int. Cl.
*G06Q 30/00* (2012.01)

(52) U.S. Cl.
USPC .................................... 705/14.43; 705/14.45

(58) Field of Classification Search
None
See application file for complete search history.

(56) References Cited

U.S. PATENT DOCUMENTS 7,216,090 B2 * 5/2007 LaCroix ...................... 705/14.73
8,036,931 B2 * 10/2011 Hale et al. ..................... 705/14.1
2006/0235965 A1 * 10/2006 Bennett et al. ................ 709/224

* cited by examiner

*Primary Examiner* — Arthur Duran
*Assistant Examiner* — Christopher Busch
(74) *Attorney, Agent, or Firm* — Brinks Hofer Gilson & Lione (57) ABSTRACT

Techniques are described herein for combining segments of users into super-segments. The interests of the segments in online ad campaigns in which they participate are compared to determine subsets of the segments whose interests are correlated to an extent that exceeds a designated threshold. The segments in each subset are combined to provide a respective super-segment. Each online ad campaign corresponds to a specified category, such as telecommunications, auto, finance, retail, entertainment, travel, etc. For each super-segment, the cumulative interest of the segments therein for each category are determined. The cumulative interests for each super-segment are used to determine which super-segment(s) are to be targeted for receiving a specified online advertisement. For instance, the cumulative interests of the respective super-segments in the category most closely related to a subject matter with which the specified online advertisement is associated may be compared to determine which super-segment(s) are to be targeted.

17 Claims, 6 Drawing Sheets

COMBINING SEGMENTS OF USERS INTO VERTICALLY INDEXED SUPER-SEGMENTS

BACKGROUND OF THE INVENTION

1. Field of the Invention

The present invention relates to online advertising.

2. Background

Certain advertisement ("ad") networks enable ads (e.g., contextual ads, display ads) to be served to users who visit the Web sites of publishers that are participating in the ad network. Advertisers generate the ads and buy placements (a.k.a. inventory) for those ads on the publishers' Web sites usually based on the anticipated audiences for those sites and/or the content of those sites. These ads may be graphical ("display ads") or textual. A placement represents a publisher's agreement to serve a trafficked (i.e., specified) ad to users when the users visit the publisher's site. The publisher often serves the trafficked display or contextual ad contemporaneously with other content associated with the publisher's site. Similarly, sponsored search advertising systems serve ads ("sponsored ads") to users that enter queries on search engine websites, often alongside the responses to the queries.

Ad networks typically include ad serving systems that determine which advertisements are to be provided to users. In conventional contextual or display ad networks, when a publisher receives a page view from a user, the publisher sends an ad call to an ad serving system. An ad call is a request for an advertisement. The ad call usually contains some information about the users visiting the publisher's site and to whom an ad is to be served. For instance, this information may include any suitable cookie-based information, including but not limited to age of the person, sex, geographic location, browsing history, segments the users fall into, etc. The ad serving system selects an advertisement from an ad inventory based on these various factors. The ad serving system also determines which segments (i.e., subsets) of the users are able to receive each advertisement. For instance, a first advertisement may be selected for provision to a first segment of the users, a second advertisement may be selected for provision to a second segment of the users, and so on.

Conventional techniques for selecting segments for receipt of advertisements are typically based on prior knowledge regarding performance of particular segments with regard to other advertisements or semantics regarding names of the segments. For example, information pertaining to performance of targeted segments with regard to previously provided advertisements that are directed to a certain subject matter may be used to determine which segments are likely to perform well with regard to a present advertisement that is directed to the same subject matter. However, it is possible that few or none of the previously provided advertisements are directed to the subject matter of the present advertisement.

In another example, an advertisement initially may be provided across all possible segments. Information pertaining to performance of each segment with regard to the advertisement may be used to determine which of the segments are to continue receiving the advertisement going forward. However, a substantial portion of a time period over which a corresponding ad campaign is to run may be used for gathering such information. Accordingly, the advertisement is often targeted to particular segments for only a fraction of the time that is allocated for the ad campaign.

In yet another example, the names of the segments may be semantically compared to the name of an advertisement to determine which segments are to receive the advertisement. For instance, the name of a segment may include the term "auto". Accordingly, the segment may be selected for receipt of an advertisement relating to an automobile. However, segments that may perform well with regard to an advertisement but that do not have names that include a matching semantic may not be selected for receipt of the advertisement.

The amount of information that is available with respect to some segments may not be sufficient for such conventional techniques to determine whether those segments are to be selected for receipt for an advertisement.

BRIEF SUMMARY OF THE INVENTION

Various approaches are described herein for, among other things, combining segments of users into super-segments. For instance, ad campaigns may be assigned among categories, with each category corresponding to a respective subject matter. Examples of subject matter with which a category may correspond include but are not limited to telecommunications, auto, finance, retail, entertainment, travel, etc. Interests of a segment with regard to respective ad campaigns may define an interest profile. If interest profiles of respective segments are correlated to at least a threshold extent, those segments may be combined into a common super-segment. For each super-segment, the cumulative interest of the segments in each category may be determined. The cumulative interests for a super-segment may be used to determine whether that super-segment is to be targeted for receiving a specified online advertisement.

An example method is described in which, for each online ad campaign that corresponds to a category of a plurality of categories, interest values of respective segments of users who are targeted by that online ad campaign are determined. Super-segments are determined in accordance with an eigenvector analysis technique that is performed with respect to the interest values. Each super-segment includes a respective subset of the segments of the users. The subset of segments in each super-segment has interest values that are correlated with regard to the online ad campaigns to an extent that exceeds a designated threshold. The super-segments are un-correlated. For each super-segment, subsets of the interest values of the subset of the segments that is included in that super-segment are determined. Each subset of the interest values indicates an interest of the subset of the segments that is included in that super-segment with respect to a corresponding category. A determination is made that one or more of the super-segments are to be targeted by a specified online advertisement that corresponds to a specified category based on the subsets of the interest values for each super-segment.

An example system is described that includes interest logic, super-segment logic, subset logic, and target logic. The interest logic is configured to determine, for each online ad campaign that corresponds to a category of a plurality of categories, interest values of respective segments of users who are targeted by that online ad campaign. The super-segment logic is configured to determine super-segments in accordance with an eigenvector analysis technique that is performed with respect to the interest values. Each super-segment includes a respective subset of the segments of the users. The subset of segments in each super-segment has interest values that are correlated with regard to the online ad campaigns to an extent that exceeds a designated threshold. The super-segments are un-correlated. The subset logic is configured to determine, for each super-segment, subsets of the interest values of the subset of the segments that is included in that super-segment. Each subset of the interest values indicates an interest of the subset of the segments that is included in that super-segment with respect to a corresponding category. The target logic is configured to determine one or more of the super-segments to be targeted by a specified online advertisement that corresponds to a specified category based on the subsets of the interest values for each super-segment.

An example computer program product is described that includes a computer-readable medium having computer program logic recorded thereon for enabling a processor-based system to combine segments of users into super-segments. The computer program logic includes first, second, third, and fourth program logic modules. The first program logic module is for enabling the processor-based system to determine, for each online ad campaign that corresponds to a category of a plurality of categories, interest values of respective segments of users who are targeted by that online ad campaign. The second program logic module is for enabling the processor-based system to determine super-segments in accordance with an eigenvector analysis technique that is performed with respect to the interest values. Each super-segment includes a respective subset of the segments of the users. The subset of segments in each super-segment has interest values that are correlated with regard to the online ad campaigns to an extent that exceeds a designated threshold. The super-segments are un-correlated. The third program logic module is for enabling the processor-based system to determine, for each super-segment, subsets of the interest values of the subset of the segments that is included in that super-segment. Each subset of the interest values indicates an interest of the subset of the segments that is included in that super-segment with respect to a corresponding category. The fourth program logic module is for enabling the processor-based system to determine one or more of the super-segments to be targeted by a specified online advertisement that corresponds to a specified category based on the subsets of the interest values for each super-segment.

Further features and advantages of the disclosed technologies, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Example embodiments are capable of combining segments of users into super-segments. For instance, ad campaigns may be assigned among categories, with each category corresponding to a respective subject matter. Examples of subject matter with which a category may correspond include but are not limited to telecommunications, auto, finance, retail, entertainment, travel, etc. For instance, a first ad campaign may be assigned to an auto category, a second ad campaign may be assigned to a retail category, a third ad campaign may be assigned to a telecommunications (telco) category, a fourth ad campaign may be assigned to an entertainment category, and so on. Interests of a segment with regard to respective ad campaigns may define an interest profile. If interest profiles of respective segments are correlated to at least a threshold extent, those segments may be combined into a common super-segment. For each super-segment, the cumulative interest of the segments in each category may be determined. The cumulative interests for a super-segment may be used to determine whether that super-segment is to be targeted for receiving a specified online advertisement.

Techniques described herein have a variety of benefits as compared to conventional techniques for selecting segments for receipt of advertisements. For example, by determining which segments can be grouped together as super-segments, a performance index may be assigned by category to individual segments (e.g., third-party segments). The techniques may determine which segments are to be targeted when a new ad campaign is initiated based on the super-segments in which those segments are included. The super-segments may be targeted from the beginning of an ad campaign, rather than waiting for information to be gathered about those super-segments (or each segment therein) during a time period that is allocated to the ad campaign. Performance of a super-segment may be attributed to the segments that are included in that super-segment, which may increase the amount of available information regarding performance of the segments. Accordingly, those segments may be targeted more frequently in ad campaigns. The techniques may increase a click rate and/or a conversion rate that is associated with an ad campaign, as compared to conventional techniques. The techniques may reduce (e.g., eliminate) manual effort characteristic of some conventional techniques for selecting segments. For instance, the techniques may obviate a need for a human to remember how segments performed with respect to ad campaigns. The techniques may obviate a need to semantically compare names of segments to the name of an advertisement in order to determine segments that are to be targeted for receiving the advertisement. The techniques may increase an effectiveness with which data regarding segments of users is purchased. For instance, more capital may be allocated to data suppliers that provide information regarding relatively higher performing segments than to data suppliers that provide information regarding relatively lower performing segments.

II. Example Embodiments

Figure 1:
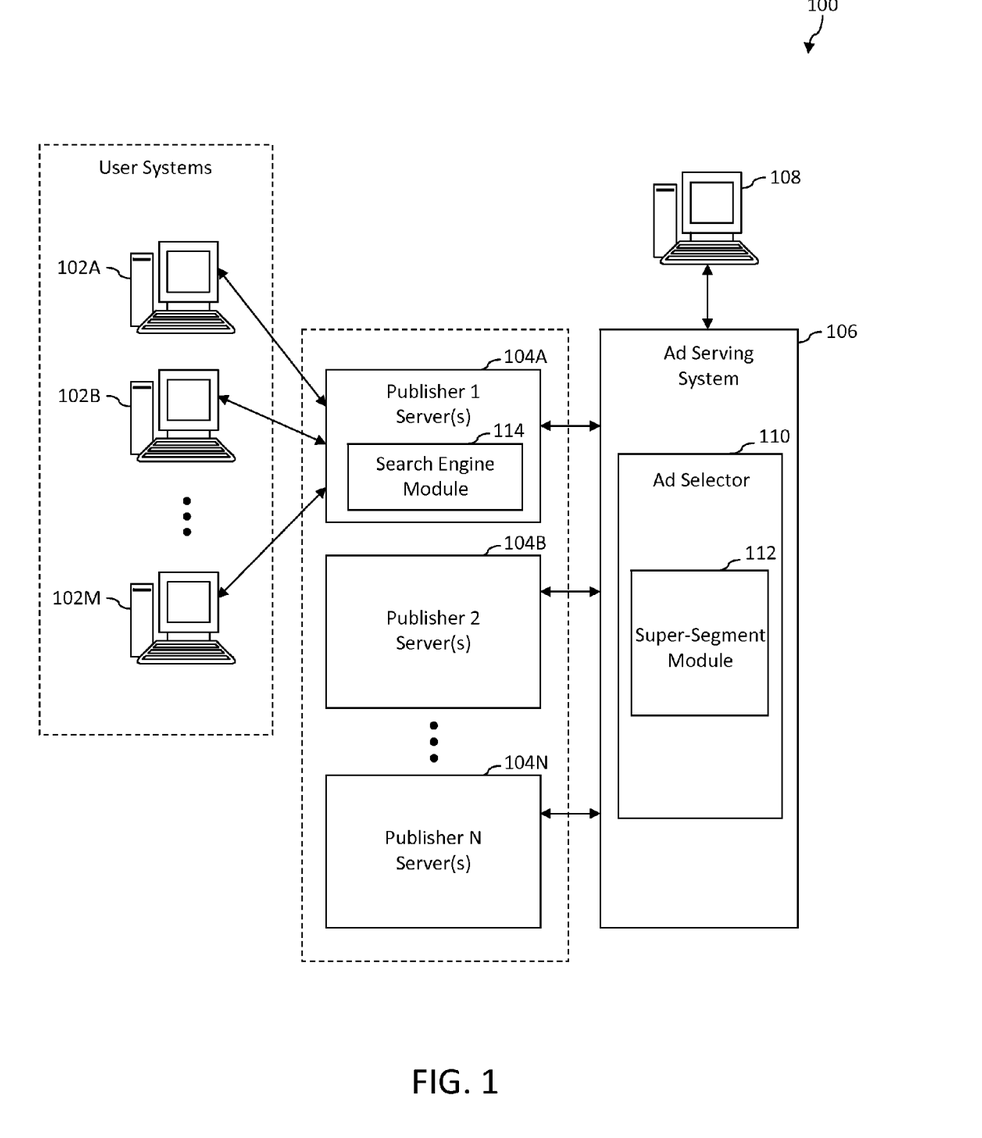
FIG. 1 is a block diagram of an example advertisement ("ad") network in accordance with an embodiment described herein.

FIG. 1 is a block diagram of an example advertisement ("ad") network 100 in accordance with an embodiment described herein. Generally speaking, ad network 100 operates to serve ads (e.g., contextual ads, sponsored ads, display ads, etc.) provided by advertisers to sites (e.g., Web sites) published by publishers when such sites are accessed by certain users of the network, thereby delivering the ads to the users. Moreover, ad network determines which segment(s) of users are to receive each ad. As shown in FIG. 1, ad network 100 includes a plurality of user systems 102A-102M, a plurality of publisher servers 104A-104N, an ad serving system 106, and at least one advertiser system 108. Communication among user systems 102A-102M, publisher servers 104A-104N, ad serving system 106, and advertiser system 108 is carried out over a network using well-known network communication protocols. The network may be a wide-area network (e.g., the Internet), a local area network (LAN), another type of network, or a combination thereof.

User systems 102A-102M are computers or other processing systems, each including one or more processors, that are capable of communicating with any one or more of publisher servers 104A-104N. For example, each of user systems 102A-102M may include a client that enables a user who owns (or otherwise has access to) the user system to access sites (e.g., Web sites) that are hosted by publisher servers 104A-104N. For instance, a client may be a Web crawler, a Web browser, a non-Web-enabled client, or any other suitable type of client. By way of example, each of user systems 102A-102M is shown in FIG. 1 to be communicatively coupled to publisher 1 server(s) 104A for the purpose of accessing a site published by publisher 1. Persons skilled in the relevant art(s) will recognize that each of user systems 102A-102M is capable of connecting to any of publisher servers 104A-104N for accessing the sites hosted thereon.

Publisher servers 104A-104N are computers or other processing systems, each including one or more processors, that are capable of communicating with user systems 102A-102M. Each of publisher servers 104A-104N is configured to host a site (e.g., a Web site) published by a corresponding publisher 1-N so that such site is accessible to users of network 100 via user systems 102A-102M. Each of publisher servers 104A-104N is further configured to serve advertisements (e.g., contextual ads, sponsored ads, display ads, etc.) to users of network 100 when those users access a Web site that is hosted by the respective publisher server.

Publisher servers 104A-104N are further configured to execute software programs that provide information to users in response to receiving requests, such as hypertext transfer protocol (HTTP) requests, from users, instant messaging (IM) applications, or web-based email. For example, the information may include Web pages, images, other types of files, output of executables residing on the publisher servers, IM chat sessions, emails, etc. In accordance with this example, the software programs that are executing on publisher servers 104A-104N may provide Web pages that include interface elements (e.g., buttons, hyperlinks, etc.) that a user may select for accessing the other types of information. The Web pages may be provided as hypertext markup language (HTML) documents and objects (e.g., files) that are linked therein, for example.

One type of software program that may be executed by any one or more of publisher servers 104A-104N is a Web search engine. For instance, publisher 1 server(s) 104A is shown to include search engine module 114, which is configured to execute a Web search engine. Search engine module 114 is capable of searching for information on the World Wide Web (WWW) based on queries that are provided by users. For example, search engine module 114 may search among publisher servers 104A-104N for requested information. Upon discovering instances of information that are relevant to a user's query, search engine module 114 ranks the instances based on their relevance to the query. Search engine module 114 provides a list that includes each of the instances in an order that is based on the respective rankings of the instances. The list may be referred to as the search results corresponding to the query.

Search engine module 114 is configured to provide an ad call to ad serving system 106, upon receiving a query from a user, to request an advertisement (e.g., a contextual ad, a sponsored ad, a display ad, etc.) to be provided to the user. Search engine module 114 forwards a user identifier that corresponds to (e.g., that specifies) the user to ad serving system 106. For example, the user identifier may include a browser cookie of the user or information that is included in the browser cookie. In another example, the user identifier may include a username that is associated with the user. Search engine module 114 may incorporate the user identifier in the ad call or may provide the user identifier in addition to the ad call.

It will be recognized that a search engine module (e.g., search engine module 114) need not necessarily be included in publisher server(s) in order for the publisher server(s) to provide an ad call to ad serving system 1016. For instance, any one or more of publisher servers 104A-104N may provide an ad call to ad serving system 106 without utilizing a search engine module.

Ad serving system 106 is a computer or other processing system, including one or more processors, that is capable of serving advertisements (e.g., contextual ads, sponsored ads, display ads, etc.) that are received from advertiser system 108 to each of publisher servers 104A-104N when the sites hosted by such servers are accessed by certain users, thereby facilitating the delivery of such advertisements to the users. For instance, ad serving system 106 may serve advertisement(s) to a publisher server 104 in response to an ad call that is received from that publisher server 104. The ad call may be initiated in response to a query that is provided by a user. Ad serving system 106 may select an appropriate advertisement to be provided to the user based on a user identifier that is received from search engine module 114.

Ad serving system 106 includes an ad selector 110. Ad selector 110 is configured to select an advertisement (e.g., a contextual ad, a sponsored ad, a display ad, etc.) for provision to a user based on the user information contained in the ad call. This user information may or may not be related to a super-segment. A super-segment is a combination of segments of users. A segment of users is a subset of the users that is associated with a respective topic. For instance, a first segment of the users may have read online articles about crime. In accordance with this example, the first segment may be associated with a topic of "crime articles". In another example, a second segment of the users may have accessed an online gaming website. Accordingly, the second segment may be associated with a topic of "online gaming". Actions of the users (e.g., reading online articles about crime, accessing an online gaming website, etc.) may be determined based on cookies that are associated with the users. When a user visits a website, for example, a provider of the website may insert an indication of the user's visit in a cookie of the user. Users who perform similar online activities (e.g., access a common website) are said to belong to a common segment. A topic with which the segment is associated depends on the nature of the online activity (e.g., subject matter of a website that is accessed by the users in the segment). A user may be included in more than one segment. Techniques for combining segments into super-segments are discussed in greater detail below with reference to super-segment module 112 and FIGS. 2-5.

Ad selector 110 receives an ad call from a publisher server 104. The ad call requests an advertisement to be displayed to a user. Ad selector 110 receives a user identifier that corresponds to the user from the publisher server 104. The user identifier may be included in the ad call or may be received in addition to the ad call. Ad selector 110 may use the user identifier to determine which super-segment the user falls into. For instance, ad selector 110 may access a look-up table and compare the user identifier with information (e.g., metadata) stored in the look-up table that is associated with the super-segments among which users are assigned to determine to which of the super-segments the user is assigned.

Ad selector 110 includes a super-segment module 112. Super-segment module 112 combines segments of users into super-segments. For example, super-segment module 112 stores information regarding performance of online ad campaigns. The performance of each online ad campaign reflects the interest of each segment that was targeted by the online ad campaign or was otherwise allowed to participate in the online ad campaign. Each online ad campaign corresponds to a specified category, such as telecommunications, auto, finance, retail, entertainment, travel, etc. The performance among the online ad campaigns for each segment may be compared to determine subsets of the segments whose performance is correlated to an extent that exceeds a designated threshold. Super-segment module 112 combines the segments in each subset to provide a respective super-segment.

The information regarding the performance of the online ad campaigns indicates to which category each online campaign is assigned. Super-segment module 112 uses such information to determine for each super-segment the cumulative interest of the segments in that super-segment in each category. Super-segment module 112 uses the cumulative interests for each super-segment to determine which super-segment(s) are to be targeted for receiving a specified online advertisement. For example, super-segment module 112 may compare the cumulative interests of the respective super-segments in the category that is most closely related to a subject matter with which the specified online advertisement is associated to determine which super-segment(s) are to be targeted. In accordance with this example, super-segment module 112 may determine that a designated super-segment is to be targeted based on the cumulative interest of that super-segment in the category being a highest cumulative interest of the cumulative interests of the respective super-segments, based on the cumulative interest of that super-segment exceeding a specified threshold, and/or based on any other suitable criteria. As mentioned above, techniques for combining segments into super-segments are discussed in greater detail below with reference to FIGS. 2-5.

Advertiser system 108 is a computer or other processing system, including one or more processors, that is capable of providing advertisements (e.g., contextual ads, sponsored ads, display ads, etc.) to ad serving system 106, so that the advertisements may be served to publisher servers 104A-104N when the sites hosted by the respective servers are accessed by certain users. Although one advertiser system 108 is depicted in FIG. 1, persons skilled in the relevant art(s) will recognize that any number of advertiser systems may be communicatively coupled to ad serving system 106.

Although advertiser system 108 and user systems 102A-102M are depicted as desktop computers in FIG. 1, persons skilled in the relevant art(s) will appreciate that advertiser system 108 and user systems 102A-102M may include any browser-enabled system or device, including but not limited to a laptop computer, a tablet computer, a personal digital assistant, a cellular telephone, or the like.

Figure 2A:
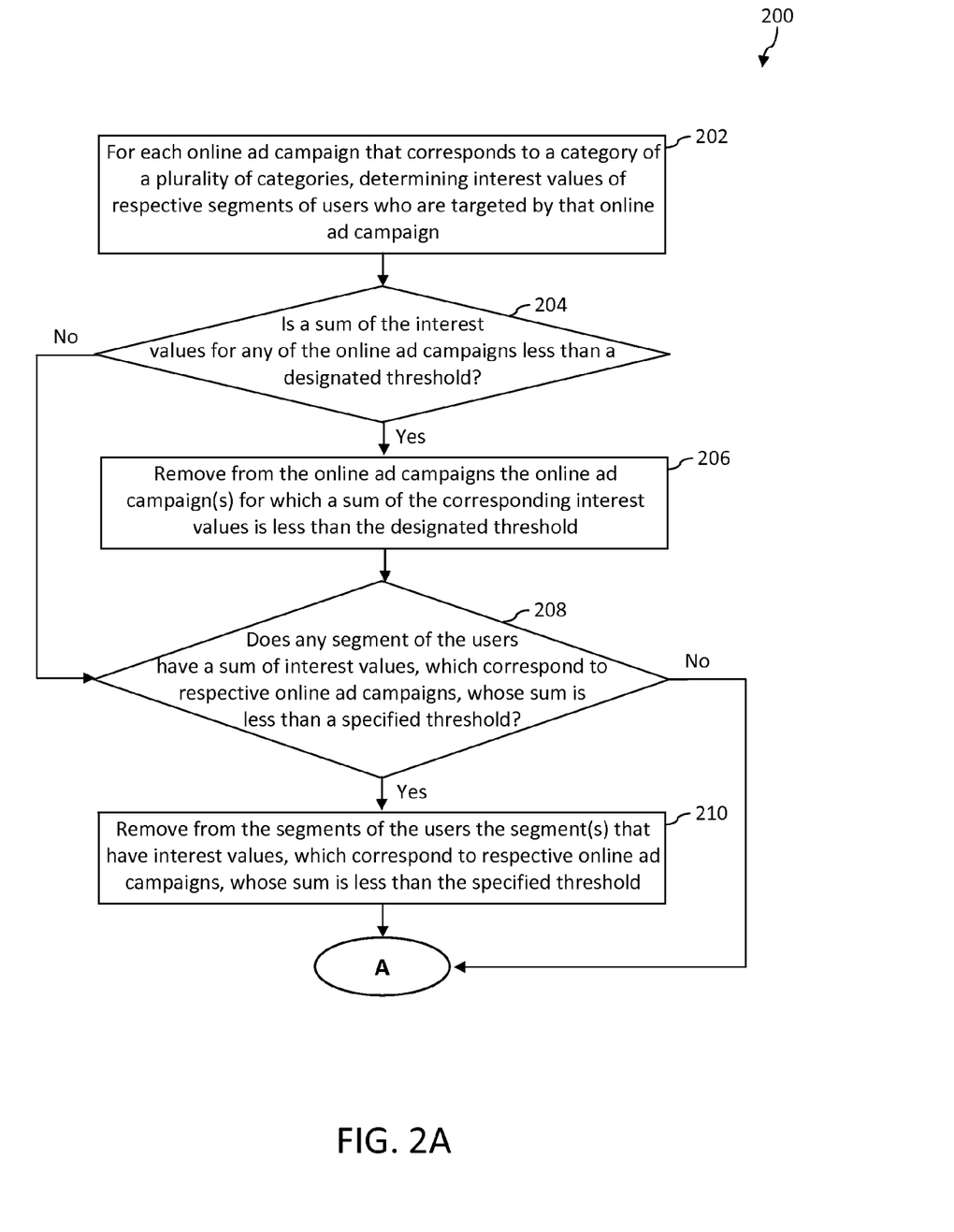
FIGS. 2A and 2B depict respective portions of a flowchart of an example method for combining segments of users into super-segments in accordance with embodiments described herein.
Figure 2B:
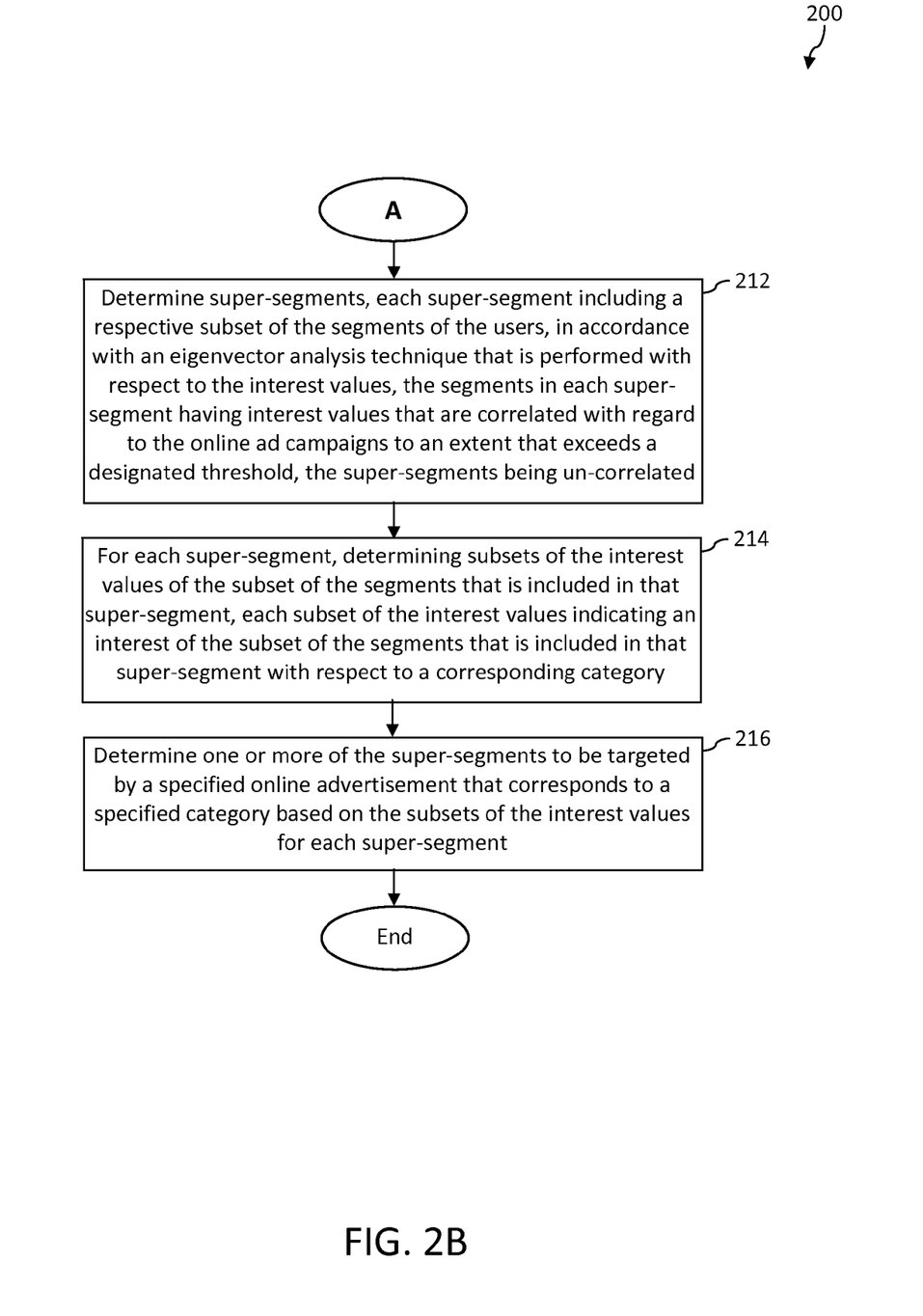
Figure 3:
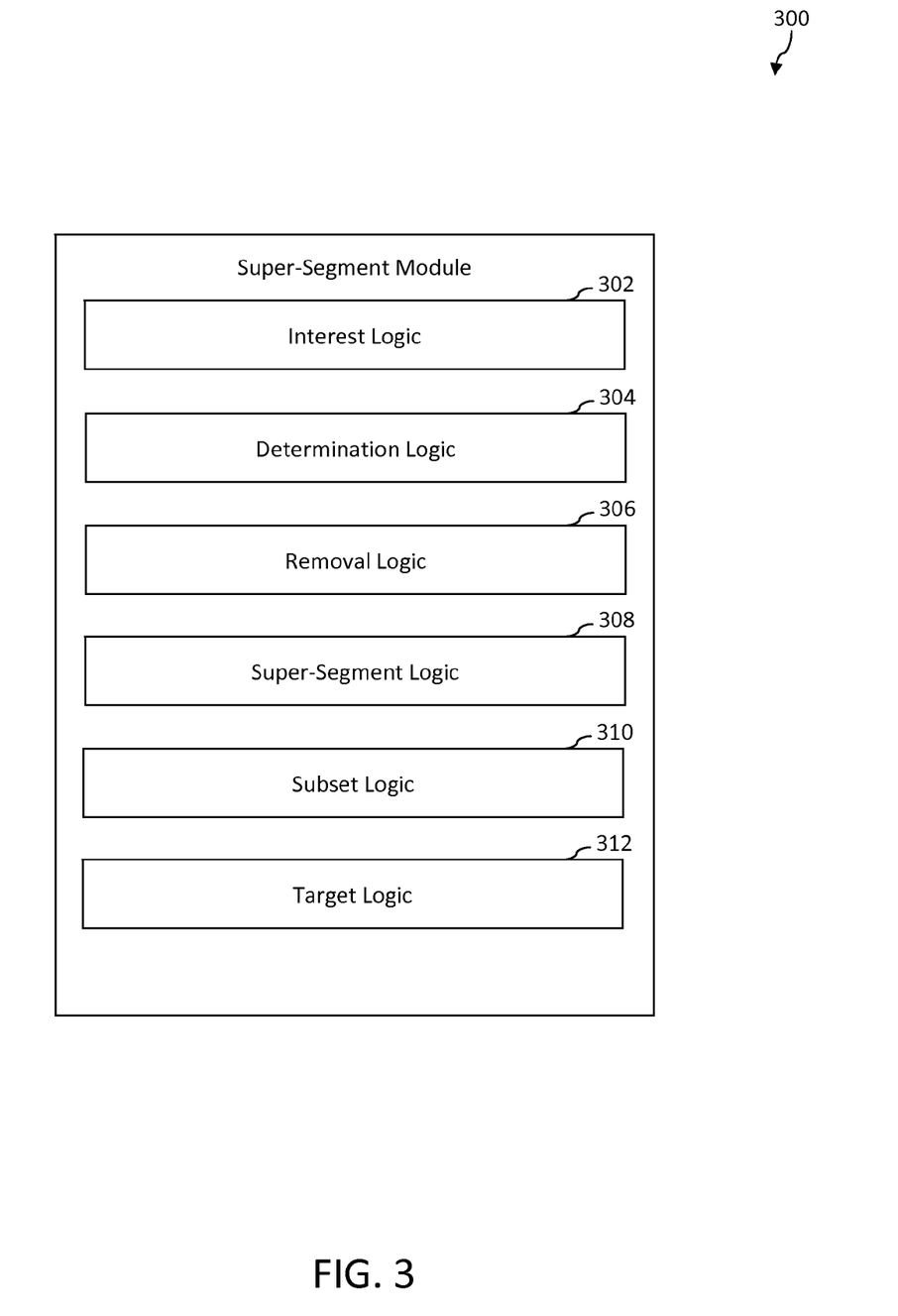
FIG. 3 is a block diagram of an example implementation of a super-segment module shown in FIG. 1 in accordance with an embodiment described herein.

FIGS. 2A and 2B depict respective portions of a flowchart 200 of an example method for combining segments of users into super-segments in accordance with embodiments described herein. Flowchart 200 may be performed by super-segment module 112 of ad network 100 shown in FIG. 1, for example. For illustrative purposes, flowchart 200 is described with respect to a super-segment module 300 shown in FIG. 3, which is an example of a super-segment module 112, according to an embodiment. As shown in FIG. 3, super-segment module 300 includes interest logic 302, determination logic 304, removal logic 306, super-segment logic 308, subset logic 310, and target logic 312. Further structural and operational embodiments will be apparent to persons skilled in the relevant arts) based on the discussion regarding flowchart 200.

As shown in FIG. 2A, the method of flowchart 200 begins at step 202. In step 202, for each online ad campaign that corresponds to a category of a plurality of categories, interest values of respective segments of users who are targeted by that online ad campaign are determined. Each interest value indicates an amount of interest that the respective segment of the users has with respect to that online ad campaign. For instance, each interest value may indicate a number of impressions, clicks, conversions, or any combination thereof that the respective segment of the users performs with respect to the corresponding online ad campaign. Each segment of the users is associated with a respective topic. In an example implementation, interest logic 302 determines the interest values of the respective segments for each of the online ad campaigns.

At step 204, a determination is made whether a sum of the interest values for any of the online ad campaigns is less than a designated threshold. If a sum of the interest values for any of the online ad campaigns is less than the designated threshold, flow continues to step 206. Otherwise, flow continues to step 208. In an example implementation, determination logic 304 determines whether a sum of the interest values for any of the online ad campaigns is less than the designated threshold.

At step 206, the online ad campaign(s) for which a sum of the corresponding interest values is less than the designated threshold are removed from the online ad campaigns. In an example implementation, removal logic 306 removes from the online ad campaigns the online ad campaign(s) for which a sum of the corresponding interest values is less than the designated threshold.

At step 208, a determination is made whether any segment of the users has a sum of interest values, which correspond to respective online ad campaigns, whose sum is less than a specified threshold. If any segment of the users has a sum of interest values whose sum is less than the specified threshold, flow continues to step 210. Otherwise, flow continues to step 212, which is shown in FIG. 2B. In an example implementation, determination logic 304 determines whether any segment of the users has a sum of interest values, which correspond to respective online ad campaigns, whose sum is less than the specified threshold.

At step 210, the segment(s) of the users that have interest values, which correspond to respective online ad campaigns, whose sum is less than the specified threshold are removed from the segments. In an example implementation, removal logic 306 removes from the segments of the users the segment(s) that have interest values, which correspond to respective online ad campaigns, whose sum is less than the specified threshold. Upon completion of step 210, flow continues to step 212, which is shown in FIG. 2B.

At step 212, super-segments are determined in accordance with an eigenvector analysis technique that is performed with respect to the interest values. Each super-segment includes a respective subset of the segments of the users. The segments in each super-segment have interest values that are correlated with regard to the online ad campaigns to an extent that exceeds a designated threshold. The super-segments are uncorrelated. Examples of an eigenvector analysis technique include but are not limited to a principal component analysis technique, a factor analysis technique, and a singular value decomposition technique. In an example implementation, super-segment logic 308 determines the super-segments.

In an example embodiment, any of a variety of techniques may be used to measure sampling adequacy and/or selection of variables for use in accordance with the eigenvector analysis technique. Examples of such techniques include but are not limited to Bartlett's test of sphericity, partial correlation coefficient index (e.g., Kaiser-Meyer-Olkin (KMO) index), anti-image correlation matrix, orthogonal rotation (e.g., varimax, quartimax, or equimax rotation), oblique rotation (direct oblimin or promax), etc. Any one or more of such techniques may be triggered based on designated (e.g., predetermined) criteria. For instance, if KMO<0.5, segments having a relatively low KMO (e.g., a specified number of segments, segments having a KMO less than a designated threshold (e.g., 0.5), etc.) may be removed from consideration for inclusion among the super-segments. A determination as to which segments are to be removed may be based on an anti-image correlation matrix regarding the segments, for example.

In another example embodiment, any of a variety of techniques may be used to select a number of super-segments that are to be determined in accordance with the eigenvector analysis technique. Examples of such techniques include but are not limited to a scree plot, eigen value cut-off criteria, cumulative variance explained, interpretability of the solution, component rotation, etc. A number of super-segments determined in accordance with a technique described herein may be proportional to an amount of information (e.g., variance) regarding the underlying segments that is retained. Accordingly, reduction of the number of super-segments may be weighed against completeness of the retained information to determine how many super-segments are to be selected. For instance, selection of 18 super-segments may result in retention of 80% of the information regarding the underlying segments; selection of 3 super-segments may result in retention of 25% of the information, and so on. These values are provided for illustrative purposes and are not intended to be limiting. The amount of information retained based on selection of a specified number of super-segments may be dependent on a particular application of the techniques described herein. A rotated component matrix may include information that indicates in which super-segment each segment is included.

At step 214, for each super-segment, subsets of the interest values of the subset of the segments that is included in that super-segment are determined. Each subset of the interest values indicates an interest of the subset of the segments that is included in that super-segment with respect to a corresponding category. In an example implementation, subset logic 310 determines the subsets of the interest values for each super-segment.

At step 216, one or more of the super-segments are determined to be targeted by a specified online advertisement that corresponds to a specified category based on the subsets of the interest values for each super-segment. In an example implementation, target logic 312 determines one or more of the super-segments to be targeted by the specified online advertisement.

In an example embodiment, determining the subsets for each super-segment at step 214 includes, for each of the online ad campaigns, dividing a first cumulative interest value that represents a sum of the interest values of the subset of the segments that is included in each super-segment by a second cumulative interest value that represents a sum of the interest values of the segments of the users who are targeted by that online ad campaign to provide a respective indexed interest value. In accordance with this embodiment, determining one or more of the super-segments to be targeted at step 216 includes determining one or more of the super-segments to be targeted based on the indexed interest values for each of the online ad campaigns.

In some example embodiments, one or more steps 202, 204, 206, 208, 210, 212, 214, and/or 216 of flowchart 200 may not be performed. Moreover, steps in addition to or in lieu of steps 202, 204, 206, 208, 210, 212, 214, and/or 216 may be performed.

It will be recognized that super-segment module 300 may not include one or more of interest logic 302, determination logic 304, removal logic 306, super-segment logic 308, subset logic 310, and/or target logic 312. Furthermore, super-segment module 300 may include modules in addition to or in lieu of interest logic 302, determination logic 304, removal logic 306, super-segment logic 308, subset logic 310, and/or target logic 312.

Figure 4:
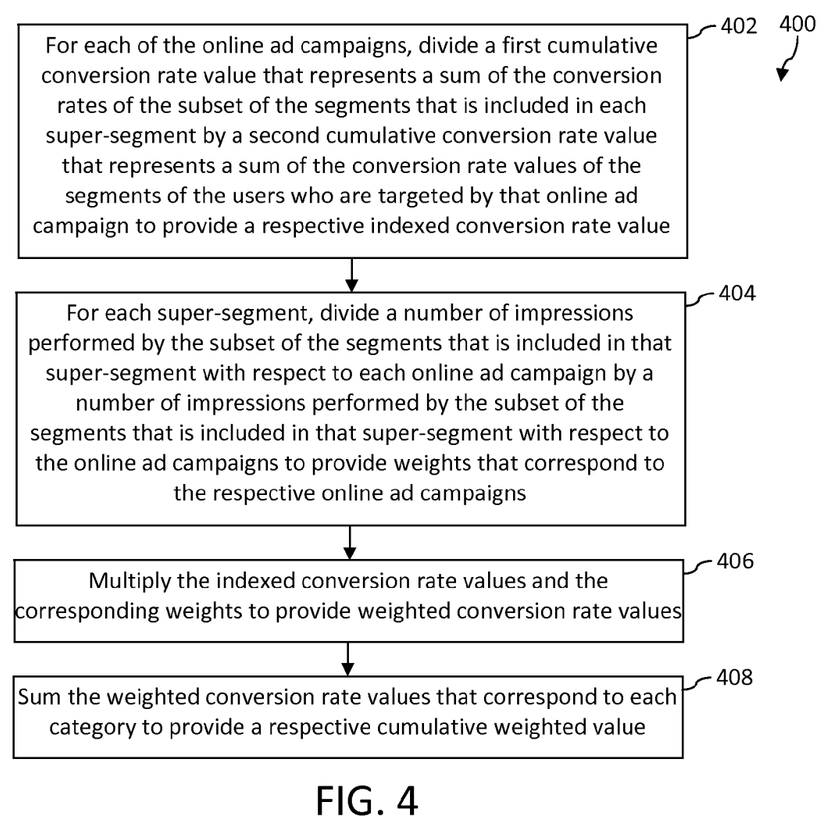
FIG. 4 depicts a flowchart of an example method for determining subsets of interest values that pertain to a super-segment in accordance with an embodiment described herein.
Figure 5:
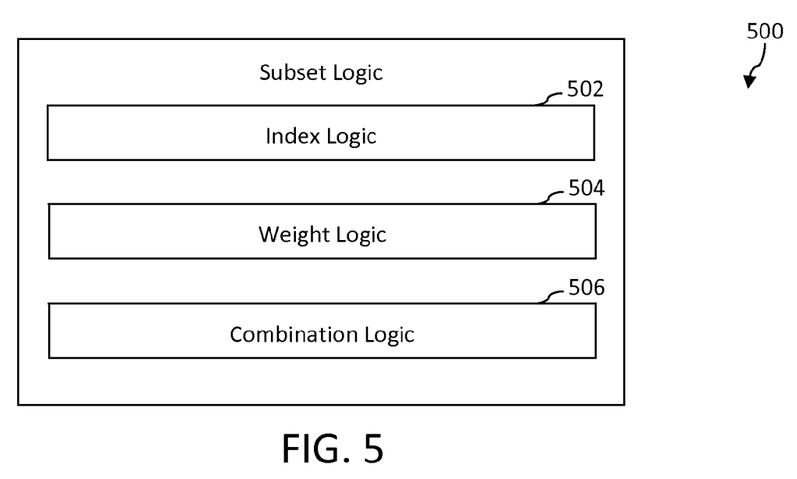
FIG. 5 is a block diagram of an example implementation of subset logic shown in FIG. 3 in accordance with an embodiment described herein.

FIG. 4 depicts a flowchart 400 of an example implementation of step 214 of FIG. 2 in accordance with an embodiment described herein. Flowchart 400 may be performed by subset logic 310 shown in FIG. 3, for example. For illustrative purposes, flowchart 400 is described with respect to subset logic 500 shown in FIG. 5, which is an example of subset logic 310, according to an embodiment. As shown in FIG. 5, subset logic 500 includes index logic 502, weight logic 504, and combination logic 506. Further structural and operational embodiments will be apparent to persons skilled in the relevant art(s) based on the discussion regarding flowchart 400.

As shown in FIG. 4, the method of flowchart 400 begins at step 402. In step 402, for each of the online ad campaigns, a first cumulative conversion rate value that represents a sum of the conversion rates of the subset of the segments that is included in each super-segment is divided by a second cumulative conversion rate value that represents a sum of the conversion rate values of the segments of the users (e.g., all users) who are reached by that online ad campaign to provide a respective indexed conversion rate value. It will be recognized that the users who are reached by the online ad campaign need not necessarily be specifically targeted by that online ad campaign. In an example implementation, index logic 502 divides the first cumulative conversion rate value for each super-segment by the second cumulative conversion rate value for the corresponding online ad campaign to provide the respective indexed conversion rate value.

At step 404, for each super-segment, a number of impressions performed by the subset of the segments that is included in that super-segment with respect to each online ad campaign is divided by a number of impressions performed by the subset of the segments that is included in that super-segment with respect to the online ad campaigns to provide weights that correspond to the respective online ad campaigns. In an example implementation, weight logic 504 divides the number of impressions performed by each super-segment with respect to each online ad campaign by the number of impressions performed by that super-segment with respect to a total of the online ad campaigns to provide weights that correspond to the respective online ad campaigns.

At step 406, the indexed conversion rate values and the corresponding weights are multiplied to provide weighted conversion rate values. In an example implementation, combination logic 506 multiplies the indexed conversion rate values and the corresponding weighs to provide the conversion weight values.

At step 408, the weighted conversion rate values that correspond to each category are summed to provide a respective cumulative weighted value. In an example implementation, combination logic 506 sums the weighted conversion rate values that correspond to each category to provide a respective cumulative weighted value.

In an example embodiment, one or more super-segments to be targeted by a specified online advertisement may be determined based on the cumulative weighted value for each category for each super-segment.

In some example embodiments, one or more steps 402, 404, 406, and/or 408 of flowchart 400 may not be performed. Moreover, steps in addition to or in lieu of steps 402, 404, 406, and/or 408 may be performed.

It will be recognized that subset logic 500 may not include one or more of index logic 502, weight logic 504, and/or combination logic 506. Furthermore, subset logic 500 may include modules in addition to or in lieu of index logic 502, weight logic 504, and/or combination logic 506.

III. Other Example Embodiments

Ad selector 110, super-segment module 112, search engine module 114, interest logic 302, determination logic 304, removal logic 306, super-segment logic 308, subset logic 310, target logic 312, index logic 502, weight logic 504, and combination logic 506 may be implemented in hardware, software, firmware, or any combination thereof For example, ad selector 110, super-segment module 112, search engine module 114, interest logic 302, determination logic 304, removal logic 306, super-segment logic 308, subset logic 310, target logic 312, index logic 502, weight logic 504, and/or combination logic 506 may be implemented as computer program code configured to be executed in one or more processors. In another example, ad selector 110, super-segment module 112, search engine module 114, interest logic 302, determination logic 304, removal logic 306, super-segment logic 308, subset logic 310, target logic 312, index logic 502, weight logic 504, and/or combination logic 506 may be implemented as hardware logic/electrical circuitry.

IV. Example Computer Implementation

Figure 6:
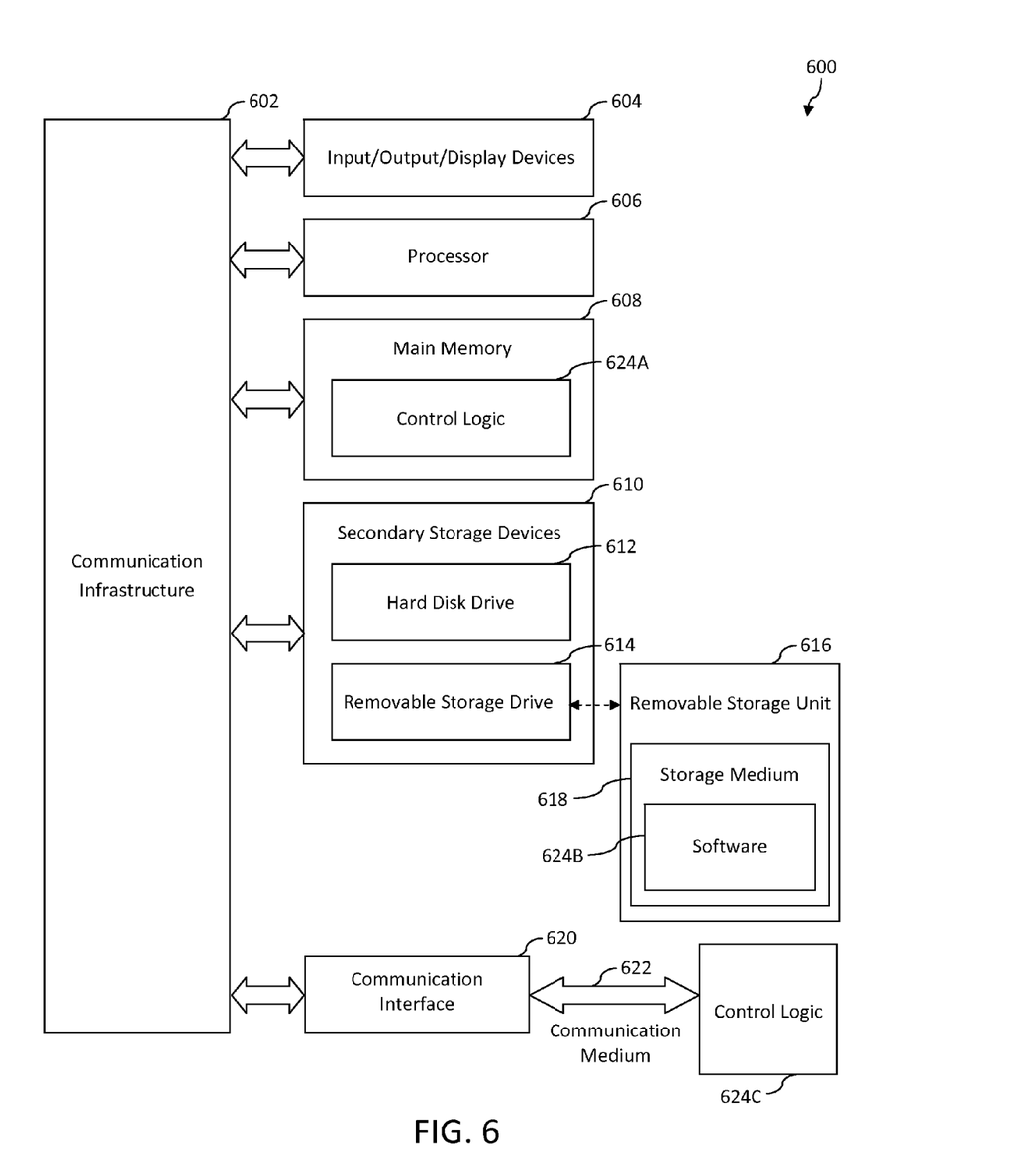
FIG. 6 is a block diagram of a computer in which embodiments may be implemented.

The embodiments described herein, including systems, methods/processes, and/or apparatuses, may be implemented using well known servers/computers, such as computer 600 shown in FIG. 6. For instance, elements of example ad network 100, including any of the user systems 102A-102M, any of the publisher servers 104A-104N, advertiser system 108, and ad serving system 106 depicted in FIG. 1 and elements thereof, each of the steps of flowchart 200 depicted in FIG. 2, and each of the steps of flowchart 400 depicted in FIG. 4 can each be implemented using one or more computers 600.

Computer 600 can be any commercially available and well known computer capable of performing the functions described herein, such as computers available from International Business Machines, Apple, Sun, HP, Dell, Cray, etc. Computer 600 may be any type of computer, including a desktop computer, a server, etc.

As shown in FIG. 6, computer 600 includes one or more processors (e.g., central processing units (CPUs)), such as processor 606. Processor 606 may include ad selector 110, super-segment module 112, and/or search engine module 114 of FIG. 1; interest logic 302, determination logic 304, removal logic 306, super-segment logic 308, subset logic 310, and/or target logic 312 of FIG. 3; index logic 502, weight logic 504, and/or combination logic 506 of FIG. 5; or any portion or combination thereof, for example, though the scope of the embodiments is not limited in this respect. Processor 606 is connected to a communication infrastructure 602, such as a communication bus. In some embodiments, processor 606 can simultaneously operate multiple computing threads.

Computer 600 also includes a primary or main memory 608, such as a random access memory (RAM). Main memory has stored therein control logic 624A (computer software), and data.

Computer 600 also includes one or more secondary storage devices 610. Secondary storage devices 610 include, for example, a hard disk drive 612 and/or a removable storage device or drive 614, as well as other types of storage devices, such as memory cards and memory sticks. For instance, computer 600 may include an industry standard interface, such as a universal serial bus (USB) interface for interfacing with devices such as a memory stick. Removable storage drive 614 represents a floppy disk drive, a magnetic tape drive, a compact disk drive, an optical storage device, tape backup, etc.

Removable storage drive 614 interacts with a removable storage unit 616. Removable storage unit 616 includes a computer useable or readable storage medium 618 having stored therein computer software 624B (control logic) and/or data. Removable storage unit 616 represents a floppy disk, magnetic tape, compact disc (CD), digital versatile disc (DVD), Blue-ray disc, optical storage disk, memory stick, memory card, or any other computer data storage device. Removable storage drive 614 reads from and/or writes to removable storage unit 616 in a well known manner.

Computer 600 also includes input/output/display devices 604, such as monitors, keyboards, pointing devices, etc.

Computer 600 further includes a communication or network interface 620. Communication interface 620 enables computer 600 to communicate with remote devices. For example, communication interface 620 allows computer 600 to communicate over communication networks or mediums 622 (representing a form of a computer useable or readable medium), such as local area networks (LANs), wide area networks (WANs), the Internet, etc. Network interface 620 may interface with remote sites or networks via wired or wireless connections. Examples of communication interface 622 include but are not limited to a modem, a network interface card (e.g., an Ethernet card), a communication port, a Personal Computer Memory Card International Association (PCMCIA) card, etc.

Control logic 624C may be transmitted to and from computer 600 via the communication medium 622.

Any apparatus or manufacture comprising a computer useable or readable medium having control logic (software) stored therein is referred to herein as a computer program product or program storage device. This includes, but is not limited to, computer 600, main memory 608, secondary storage devices 610, and removable storage unit 616. Such computer program products, having control logic stored therein that, when executed by one or more data processing devices, cause such data processing devices to operate as described herein, represent embodiments of the invention.

For example, each of the elements of example ad selector 110, super-segment module 112, and search engine module 114, each depicted in FIG. 1; interest logic 302, determination logic 304, removal logic 306, super-segment logic 308, subset logic 310, and target logic 312, each depicted in FIG. 3; index logic 502, weight logic 504, and combination logic 506, each depicted in FIG. 5; each of the steps of flowchart 200 depicted in FIG. 2; and each of the steps of flowchart 400 depicted in FIG. 4 can be implemented as control logic that may be stored on a computer useable medium or computer readable medium, which can be executed by one or more processors to operate as described herein.

As used herein, the terms "computer program medium" and "computer-readable medium" are used to generally refer to media such as a hard disk associated with hard disk drive 612, removable storage unit 616, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method comprising:
for each of a plurality of online ad campaigns that corresponds to a category of a plurality of sub-categories, determining, by a processor, a plurality of interest values of a plurality of respective segments of users who are targeted by that online ad campaign, each interest value indicating an amount of interest that the respective segment of the users has with respect to that online ad campaign, each segment of the users being associated with a respective topic;
determining, by a processor, a plurality of super-segments, each super-segment including a respective subset of the segments of the users, in accordance with an eigenvector analysis technique that is performed with respect to the pluralities of interest values, the subset of segments in each super-segment having interest values that are correlated with regard to the plurality of online ad campaigns to an extent that exceeds a designated threshold, the plurality of super-segments being un-correlated;
for each super-segment, determining, by a processor, a plurality of subsets of the interest values of the subset of the segments that is included in that super-segment, each subset of the interest values indicating an interest of the subset of the segments that is included in that super-segment with respect to a corresponding category of the plurality of categories, including, for each of the plurality of online ad campaigns, dividing a first cumulative interest value that represents a sum of the interest values of the subset of the segments that is included in each super-segment by a second cumulative interest value that represents a sum of the interest values of the plurality of segments of the users who are reached by that online ad campaign to provide a respective indexed interest value; and
determining, by a processor, one or more of the super-segments to be targeted by a specified online advertisement that corresponds to a specified category of the plurality of categories based the indexed interest values for each of the plurality of online ad campaigns.

2. The method of claim 1, wherein each interest value indicates a number of impressions that the respective segment of the users performs with respect to the corresponding online ad campaign.

3. The method of claim 1, wherein each interest value indicates a number of clicks that the respective segment of the users performs with respect to the corresponding online ad campaign.

4. The method of claim 1, wherein each interest value indicates a number of conversions that the respective segment of the users performs with respect to the corresponding online ad campaign.

5. The method of claim 1, further comprising:
removing from the plurality of online ad campaigns at least one online ad campaign for which a sum of the corresponding plurality of interest values is less than a designated threshold;
wherein determining the plurality of super-segments comprises:
determining the plurality of super-segments in response to removing from the plurality of online ad campaigns the at least one online ad campaign for which the sum of the corresponding plurality of interest values is less than the designated threshold.

6. The method of claim 1, further comprising:
removing from the plurality of the segments of the users at least one segment of the users that has interest values, which correspond to respective online ad campaigns of the plurality of online ad campaigns, whose sum is less than a designated threshold;
wherein determining the plurality of super-segments comprises:
determining the plurality of super-segments in response to removing from the plurality of the segments of the users the at least one segment of the users that has the interest values whose is less than the designated threshold.

7. The method of claim 1, wherein determining the plurality of super-segments comprises:
determining the plurality of super-segments in accordance with a principal component analysis technique.

8. The method of claim 1, wherein determining the plurality of super-segments comprises:
determining the plurality of super-segments in accordance with a factor analysis technique.

9. The method of claim 1, wherein determining the plurality of super-segments comprises:
determining the plurality of super-segments in accordance with a singular value decomposition technique.

10. The method of claim 1, wherein for each super-segment, determining the plurality of subsets of the interest values of the subset of the segments that is included in that super-segment comprises:
for each of the plurality of online ad campaigns, dividing a first cumulative conversion rate value that represents a sum of the conversion rates of the subset of the segments that is included in each super-segment by a second cumulative conversion rate value that represents a sum of the conversion rate values of the plurality of segments of the users who are reached by that online ad campaign to provide a respective indexed conversion rate value;
for each super-segment, dividing a number of impressions performed by the subset of the segments that is included in that super-segment with respect to each online ad campaign by a number of impressions performed by the subset of the segments that is included in that super-segment with respect to the plurality of online ad campaigns to provide a plurality of weights that correspond to the plurality of respective online ad campaigns;
multiplying the indexed conversion rate values and the corresponding weights to provide weighted conversion rate values; and
summing the weighted conversion rate values that correspond to each category to provide a respective cumulative weighted value;
wherein determine the one or more super-segments to be targeted by the specified online advertisement comprises:
determine the one or more super-segments to be targeted by the specified online advertisement based on the cumulative weighted value for each category for each super-segment.

11. A system comprising:
interest logic configured to determine, by means of a processor, for each of a plurality of online ad campaigns that corresponds to a category of a plurality of sub-categories, a plurality of interest values of a plurality of respective segments of users who are targeted by that online ad campaign, each interest value indicating an amount of interest that the respective segment of the users has with respect to that online ad campaign, each segment of the users being associated with a respective topic;
super-segment logic configured to determine a plurality of super-segments, each super-segment including a respective subset of the segments of the users, in accordance with an eigenvector analysis technique that is performed with respect to the pluralities of interest values, the subset of segments in each super-segment having interest values that are correlated with regard to the plurality of online ad campaigns to an extent that exceeds a designated threshold, the plurality of super-segments being un-correlated;
subset logic configured to determine, for each super-segment, a plurality of subsets of the interest values of the subset of the segments that is included in that super-segment, each subset of the interest values indicating an interest of the subset of the segments that is included in that super-segment with respect to a corresponding category of the plurality of categories, wherein the subset logic is configured to divide, for each of the plurality of online ad campaigns, a first cumulative interest value that represents a sum of the interest values of the subset of the segments that is included in each super-segment by a second cumulative interest value that represents a sum of the interest values of the plurality of segments of the users who are targeted by that online ad campaign to provide a respective indexed interest value; and
target logic configured to determine one or more of the super-segments to be targeted by a specified online advertisement that corresponds to a specified category of the plurality of categories based on the indexed interest values for each of the plurality of online ad campaigns.

12. The system of claim 11, further comprising:
removal logic configured to remove from the plurality of online ad campaigns at least one online ad campaign for which a sum of the corresponding plurality of interest values is less than a designated threshold.

13. The system of claim 11, further comprising:
removal logic configured to remove from the plurality of the segments of the users at least one segment of the users that has interest values, which correspond to respective online ad campaigns of the plurality of online ad campaigns, whose sum is less than a designated threshold.

14. The system of claim 11, wherein the super-segment logic is configured to determine the plurality of super-segments in accordance with a principal component analysis technique.

15. The system of claim 11, wherein the super-segment logic is configured to determine the plurality of super-segments in accordance with a factor analysis technique.

16. The system of claim 11, wherein the super-segment logic is configured to determine the plurality of super-segments in accordance with a singular value decomposition technique.

17. The system of claim 11, wherein the subset logic comprises:
index logic configured to divide, for each of the plurality of online ad campaigns, a first cumulative conversion rate value that represents a sum of the conversion rates of the subset of the segments that is included in each super-segment by a second cumulative conversion rate value that represents a sum of the conversion rate values of the plurality of segments of the users who are targeted by that online ad campaign to provide a respective indexed conversion rate value;

weight logic configured to divide, for each super-segment, a number of impressions performed by the subset of the segments that is included in that super-segment with respect to each online ad campaign by a number of impressions performed by the subset of the segments that is included in that super-segment with respect to the plurality of online ad campaigns to provide a plurality of weights that correspond to the plurality of respective online ad campaigns; and combination logic configured to multiply the indexed conversion rate values and the corresponding weights to provide weighted conversion rate values, the combination logic further configured to sum the weighted conversion rate values that correspond to each category to provide a respective cumulative weighted value;

wherein the target logic is configured to determine the one or more super-segments to be targeted by the specified online advertisement based on the cumulative weighted value for each category for each super-segment.

* * * * *